United States Patent [19]
Tsujimoto

[11] Patent Number: 5,524,023
[45] Date of Patent: Jun. 4, 1996

[54] INTERFERENCE CANCELLATION USING POWER-INVERSION ADAPTIVE ARRAY AND LMS ADAPTIVE EQUALIZER

[75] Inventor: Ichiro Tsujimoto, Tokyo, Japan

[73] Assignee: NEC Corporation, Tokyo, Japan

[21] Appl. No.: 430,608

[22] Filed: Apr. 28, 1995

[30] Foreign Application Priority Data

Apr. 28, 1994 [JP] Japan ................................. 6-113610

[51] Int. Cl.⁶ ........................................... H04B 7/10
[52] U.S. Cl. ............................................ 375/232; 375/347
[58] Field of Search ............................ 375/232, 233, 375/346, 347, 229, 348, 349; 455/52.3, 296, 297

[56] References Cited

U.S. PATENT DOCUMENTS

| | | | |
|---|---|---|---|
| 4,328,585 | 5/1982 | Monsen ........................... | 375/347 |
| 5,265,122 | 11/1993 | Rasky et al. ...................... | 375/346 |
| 5,285,482 | 2/1994 | Sehier et al. ...................... | 375/355 |
| 5,335,251 | 8/1994 | Onishi et al. ..................... | 375/347 |

FOREIGN PATENT DOCUMENTS

| | | |
|---|---|---|
| 0435547 | 2/1992 | Japan . |
| 0629890 | 2/1994 | Japan . |

OTHER PUBLICATIONS

R. T. Compton, Jr., "The Power-Inversion Adaptive Array: Concept and Performance", *IEEE Transactions on Aerospace and Electronic Systems*, vol. AES–15, No. 6, Nov. 1979, pp. 803–814.

Primary Examiner—Stephen Chin
Assistant Examiner—Dale D. Berkley
Attorney, Agent, or Firm—Sughrue, Mion, Zinn, Macpeak & Seas

[57] ABSTRACT

In an interference canceller including a pair of diversity branches, the output signals of the diversity branches are normalized respectively by first and second AGC amplifiers whose outputs are then weighted by first and second coefficients, respectively, in first and second multipliers and combined together in a diversity combiner. The first and second coefficients are derived by normalizing the output of the diversity combiner and taking the correlations between it and the outputs of the first and second AGC amplifiers. The outputs of the first and second multipliers are weighted by third and fourth coefficients, respectively. The difference between the output signals of the third and fourth multipliers is detected by a subtractor and applied to a least mean square adaptive equalizer for adaptively equalizing the difference and deriving therefrom a decision error. The third and fourth coefficients are derived by taking the correlations between the decision error and the output signals of the first and second multipliers.

8 Claims, 8 Drawing Sheets

INTERFERENCE CANCELLATION USING POWER-INVERSION ADAPTIVE ARRAY AND LMS ADAPTIVE EQUALIZER

BACKGROUND OF THE INVENTION

1. Field of the Invention

The present invention relates to cancellation of interfering signals for use in a power-inversion adaptive array.

2. Description of the Related Art

Adjacent channel interference and co-channel interference are the important problems of the mobile communications systems and digital microwave transmission systems using phase shift keying (PSK) and quadrature amplitude modulation (QAM) techniques. In the case of high speed digital transmission, in particular, frequency-modulated signals can be regarded as a narrow band interfering signal which can be easily cancelled by the use of linear and nonlinear filters. However, the signal will suffer from wideband interference from adjacent digital channels.

While the cancellation of wideband interference is difficult, a power-inversion adaptive array can be used for this purpose if the interfering signal is stronger than the desired signal by combining the interfering signals from diversity branches in opposite phases as described in a paper "The Power-Inversion Adaptive Array:Concept and Performance", R. T. Compton, IEEE Transactions, Vol. AES-15, No. 6, November 1979.

Although the power-inversion adaptive array is capable of cancelling interference if the D/U ratios (ratios of desired to undesired signals in decibels) of the diversity branches are negative, interference cannot be completely cancelled if there is a difference between the D/U ratios of the diversity branches. In radio transmission systems where the transfer coefficients of communication channels are constantly changing due to fading, the D/U ratios of the diversity branches have a low likelihood of having equal values.

On the other hand, with conventional LMS (least mean square) interference cancellers, the mean square error adopts a downwardly convexed quadric surface so that the partial differential coefficients of second order of weight coefficients assume a maximum eigen value. As a result, with an increase in the eigen value the plane of the decision error takes the shape of a sharper quadric surface. The update coefficient $\mu$ of the LMS algorithm is normally set at a sufficiently small value. However, as the quadric error surface becomes sharper, the amount of weight coefficient to be updated increases significantly so that adaptive convergence is no longer possible. It is generally recognized that the update coefficient $\mu$ must satisfy the condition $0<\mu<2/\lambda_{max}$. (where $\lambda_{max}$ is the upper limit of eigen values). For a strong interfering signal, the upper limit $\lambda_{max}$ increases correspondingly and if the update coefficient $\mu$ is set at a low value to satisfy the above condition, the convergence speed will decrease. Therefore, the LMS interference canceller cannot be used in applications where the D/U ratio is negative.

SUMMARY OF THE INVENTION

It is therefore an object of the present invention to provide cancellation of interference in a power-inversion adaptive array regardless of the sign of the D/U ratio.

Another object of the present invention is to provide cancellation of residual interference in a power-inversion adaptive array even if there is a difference in D/U ratio between the array's diversity branches.

A further object of the present invention is to provide cancellation of interference by ensuring a higher convergence speed than is possible with conventional MMSE algorithm even if the D/U ratio is negative by preventing the eigen values of the correlation matrix from increasing significantly.

According to a first aspect, the interference canceller of the present invention comprises first and second diversity branches, first and second amplifiers for normalizing the output signals of the first and second diversity branches, respectively, first and second multipliers for multiplying the output signals of the first and second amplifiers with first and second weight coefficients, respectively, and a diversity combiner for combining the output signals of the first and second multipliers. The output signal of the diversity combiner is normalized by a third amplifier. A first correlation circuit determines the correlations between the output signal of the third amplifier and the output signals of the first and second amplifiers to produce first and second correlation values, respectively, and applies the first and second correlation values to the first and second multipliers as the first and second weight coefficients. Third and fourth multipliers are provided for multiplying the output signals of the first and second multipliers with third and fourth weight coefficients, respectively. The difference between the output signals of the third and fourth multipliers is detected by a subtractor and applied to a least mean square adaptive equalizer for adaptively equalizing the difference and deriving therefrom a decision error. A second correlation circuit determines the correlations between the decision error and the output signals of the first and second multipliers to produce third and fourth correlation values and applies the third and fourth correlation values to the third and fourth multipliers as the third and fourth weight coefficients, respectively, whereby the decision error is reduced to a minimum.

According to a second aspect, the interference canceller of this invention comprises first and second diversity branches, first and second amplifiers for normalizing the output signals of the first and second diversity branches, respectively, first and second multipliers for multiplying the output signals of the first and second amplifiers with first and second weight coefficients, respectively, a diversity combiner for combining input signals applied thereto, and a third amplifier for normalizing the output signal of the diversity combiner. A first correlation circuit determines the correlations between the output signal of the third amplifier and the output signals of the first and second amplifiers to produce first and second correlation values, respectively, and applies the first and second correlation values to the first and second multipliers as the first and second weight coefficients. A subtractor is provided for detecting a difference between input signals applied thereto, and a least mean square adaptive equalizer adaptively equalizes the difference detected by the subtractor and derives a decision error. A second correlation circuit determines the correlations between a decision error and the output signals of the first and second multipliers, respectively, for producing third and fourth weight coefficients. Third and fourth multipliers are provided for multiplying the first and second weight coefficients with the third and fourth weight coefficients, respectively. The output signals of the first and second amplifiers are multiplied with the output signals of the third and fourth multipliers, respectively, to produce fifth and sixth multiplied signals which are applied to the diversity combiner and the subtractor as their input signals.

The second correlation circuit has a time constant with which it updates the first and second weight coefficients and the adaptive equalizer has a time constant with which the equalizer derives the decision error. Preferably, the time constant of the second correlation circuit is smaller than the time constant of the adaptive equalizer to avoid racing conditions for priority between the second correlation circuit and the adaptive equalizer.

BRIEF DESCRIPTION OF THE DRAWINGS

The present invention will be described in further detail with reference to the accompanying drawings, in which:

FIG. 7 is a block diagram of each correlator of FIG. 4 which is used in the second correlation stage of the canceller of FIG. 4;

FIG. 8 is a block diagram of the forward and backward filters of the decision feedback equalizer of FIG. 4;

DETAILED DESCRIPTION

Figure 1:
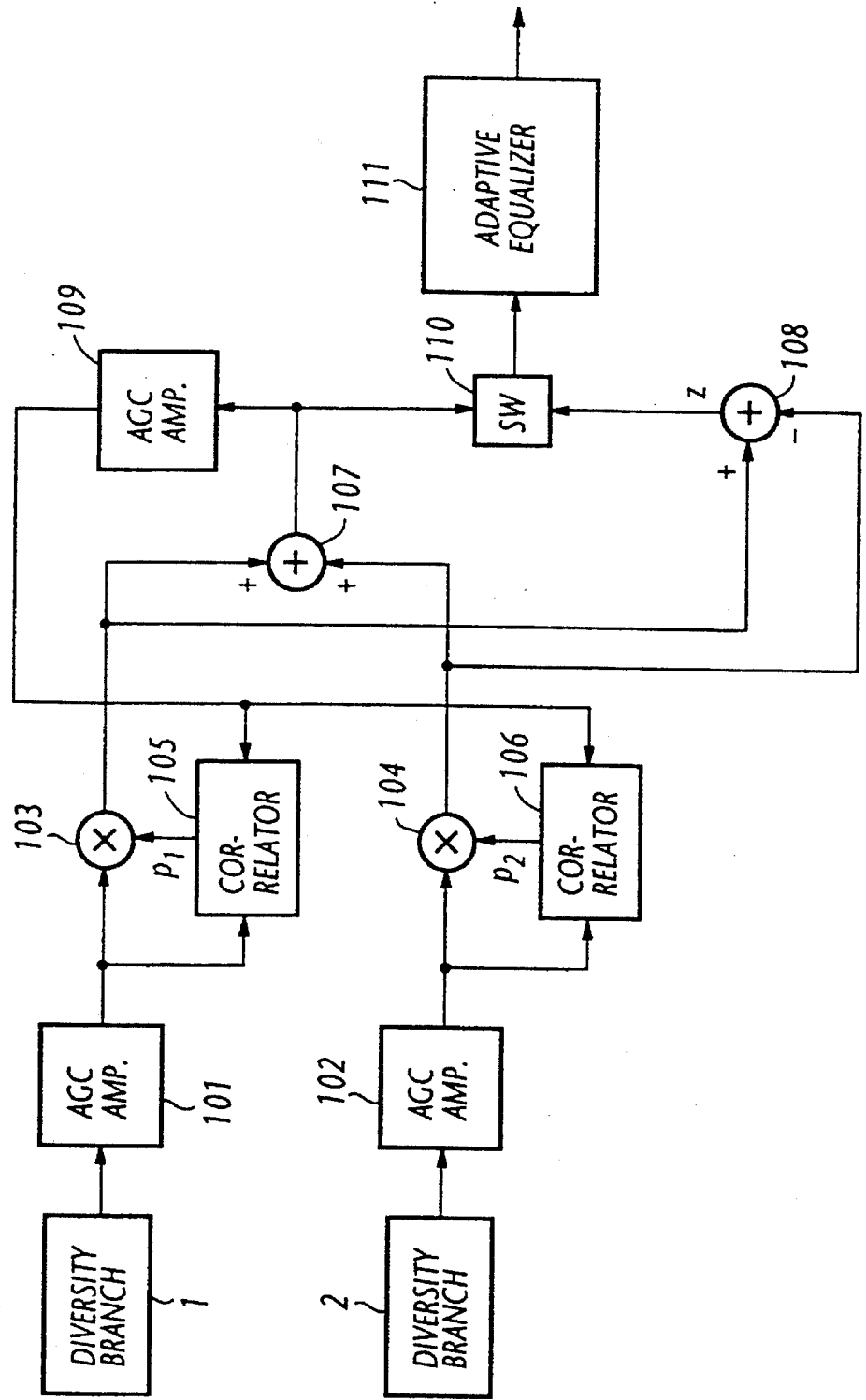
FIG. 1 is a block diagram of a first prior art interference canceller.
Figure 2:
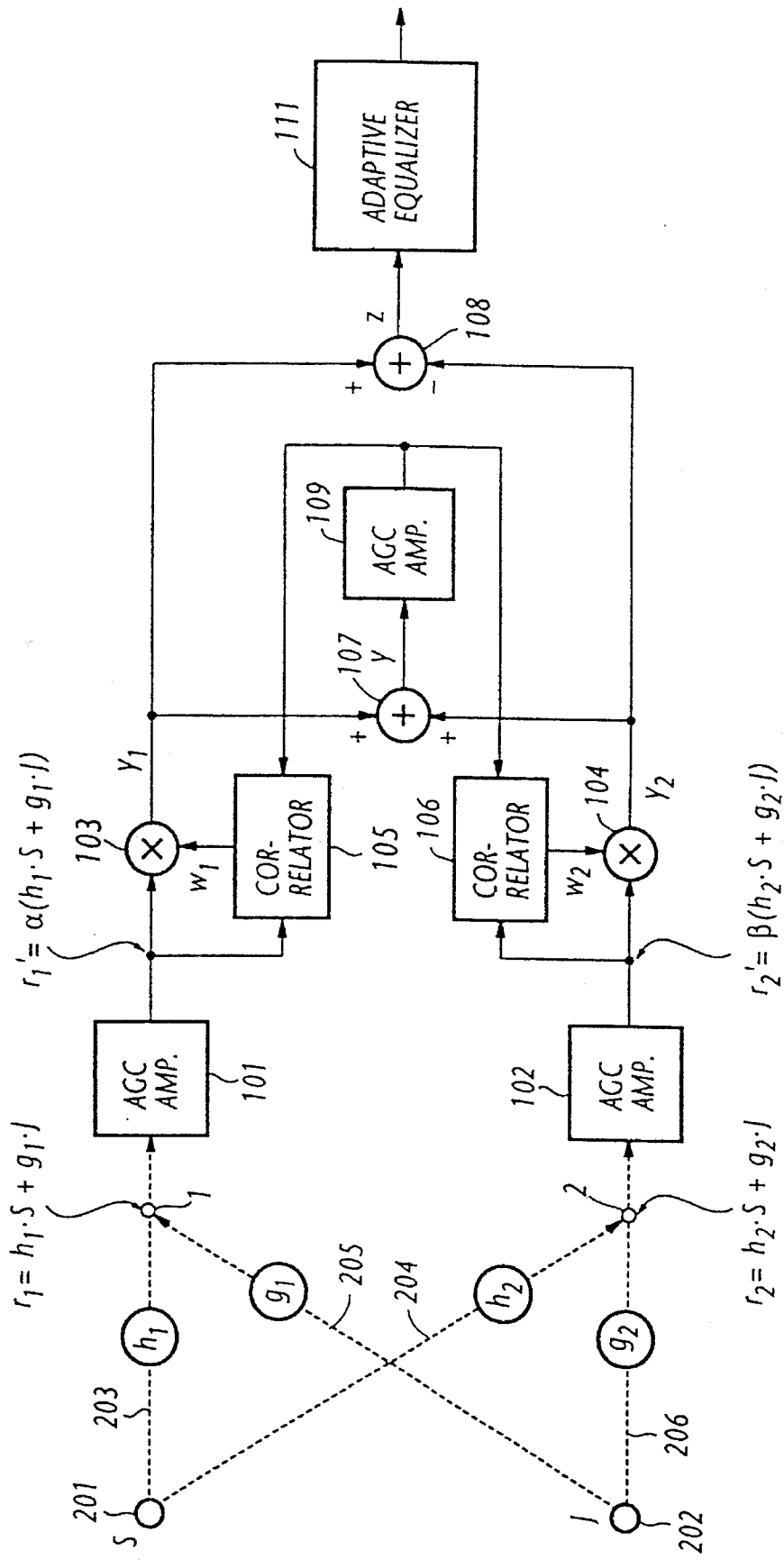
FIG. 2 is a block diagram duplicating a part of FIG. 1 for describing the operation of the prior art canceller in the presence of an interfering signal.

Before proceeding with the detailed description of the present invention, it may prove helpful to provide an explanation of the prior art with reference to FIG. 1 in which is shown a prior art diversity interference cancelling receiver using a power-inversion adaptive array. This prior art interference canceller includes automatic gain controlled (AGC) amplifiers 101 and 202 to which the output signals from diversity branches 1 and 2 are respectively supplied. Further included are complex multipliers 103 and 104, correlators 105 and 106, an adder 107 for summing the outputs of the complex multipliers 103 and 104, a subtractor 108 for providing a subtraction between the outputs of the complex multipliers 103 and 104, an AGC amplifier 109 for amplifying the output of the adder 107, a selector 110 for selecting one of the outputs of the adder 107 and subtractor 108 depending on the presence or absence of an interfering signal, and an adaptive equalizer 111 to which the output of the selector 110 is applied. A portion of FIG. 1 which operates during the presence of an interfering signal is schematically illustrated in FIG. 2 for convenience. In FIG. 2, a desired signal S from a source 201 is propagated through a fading channel 203 having a transfer coefficient $h_1$ to the diversity branch 1 and applied to the AGC amplifier 101. This signal is also propagated through a fading channel 204 of transfer coefficient $h_2$ to the diversity branch 2 and applied to the AGC amplifier 102. On the other hand, an interfering signal J from a jamming source 202 is propagated through a fading channel 205 of transfer coefficient $g_1$ to the diversity branch 1 and applied to the AGC amplifier 101 and as well as through a fading channel 206 of transfer coefficient $g_2$ to the diversity branch 2 and applied to the AGC amplifier 102. The signals $r_1$ and $r_2$ received at the diversity branches 1 and 2, respectively, are given by the following relations:

$$r_1 = h_1 \cdot S + g_1 \cdot J \quad (1)$$

$$r_2 = h_2 \cdot S + g_2 \cdot J \quad (2)$$

where, the transfer coefficients $h_1$, $h_2$, $g_1$, $g_2$ are complex numbers and S and J are assumed to be real numbers. The function of AGC amplifiers 101 and 102 is to normalize the power of the respectively received branch signals. Let $r_1'$ and $r_2'$ to denote the output signals of the AGC amplifiers 101 and 102, the following Equations result:

$$r_1' = \alpha(h_1 \cdot S + g_1 \cdot J) \quad (3)$$

$$r_2' = \beta(h_2 \cdot S + g_2 \cdot J) \quad (4)$$

where, $\alpha$ and $\beta$ are the normalizing constants of the AGC amplifiers 101 and 102, respectively, and given by the following relations:

$$\alpha = 1/\sqrt{h_1{}^* \cdot h_1 \cdot S^2 + g_1{}^* \cdot g_1 \cdot J^2} \quad (5)$$

$$\beta = 1/\sqrt{h_2{}^* \cdot h_2 \cdot S^2 + g_2{}^* \cdot g_2 \cdot J^2} \quad (6)$$

(where, it is assumed that the signal to noise ratio is relatively high so that the AGC amplifiers do not respond to noise).

The output signal $r_1'$ of the AGC amplifier 101 is supplied to the correlator 105 where the correlation between it and the output of the AGC amplifier 109 is taken to produce a correlation output, which is then multiplied in multiplier 103 by the signal $r_1'$ supplied direct from AGC amplifier 101. In like manner, output signal $r_2'$ of the AGC amplifier 102 is supplied to the correlator 106 where the correlation between it and the output of the AGC amplifier 109 is taken to produce a correlation output, which is then multiplied in multiplier 104 by the signal $r_2'$ supplied direct from AGC amplifier 102. By respectively representing the correlation outputs as $w_1$ and $w_2$ and the outputs of the multipliers 103 and 104 as $y_1$ and $y_2$, the signals $y_1$ and $y_2$ are given by the following relations using Equations (3) and (4):

$$y_1 = r_1' \cdot w_1 = w_1 \cdot \alpha(h_1 \cdot S + g_1 \cdot J) \quad (7)$$

$$y_2 = r_2' \cdot w_2 = w_2 \cdot \beta(h_2 \cdot S + g_2 \cdot J) \quad (8)$$

The output signal y of adder 107 is therefore given in the form:

$$y = y_1 + y_2 = (w_1 \cdot \alpha \cdot h_1 + w_2 \cdot \beta \cdot h_2)S + (w_1 \cdot \alpha \cdot g_1 + w_2 \cdot \beta \cdot g_2)J \quad (9)$$

Since the power-inversion adaptive array is effective when the power of the interfering signal is much greater than that of the desired signal as described above, i.e., D/U<<0 (dB), Equation (9) can be approximated as follows:

$$y = (w_1 \cdot \alpha \cdot g_1 + w_2 \cdot \beta \cdot g_2) J \qquad (10)$$

As a result, the AGC amplifier 109 provides normalization on the interfering signal in accordance with the power $P_J(=J^2)$ to produce a signal $R_J$ of the form:

$$R_J = J/P_J \qquad (11)$$

The correlator 105 calculates the correlation between the normalized output signal $R_J$ and the input signal $r_1'$ to produce the weight coefficient $w_1$ and the correlator 106 calculates the correlation between the normalized output signal $R_J$ and the input signal $r_2'$ to produce the weight coefficient $w_2$. The weight coefficients $w_1$ and $w_2$ are given as follows:

$$\begin{aligned} w_1 &= E[\int (r_1' * \cdot R_J) dt] \qquad (12) \\ &= E[\int \alpha (h_1 \cdot S + g_1 \cdot J) * \cdot J/P_J \} dt] \\ &= \alpha \cdot g_1 * \cdot E[\int (J^2/P_J) dt] = \alpha \cdot g_1 * \end{aligned}$$

$$\begin{aligned} w_2 &= E[\int (r_2' * \cdot R_J) dt] \qquad (13) \\ &= E[\int \beta (h_2 \cdot S + g_2 \cdot J) * \cdot J/P_J \} dt] \\ &= \beta \cdot g_2 * \cdot E[\int (J^2/P_J) dt] = \beta \cdot g_2 * \end{aligned}$$

where, E[ ] represents the estimated value produced by an averaging process, and the symbol * indicates complex conjugate. Substituting the weight coefficients $w_1$ and $w_2$ into Equations 7 and 8 gives:

$$y_1 = \alpha^2 \cdot g_1 * \cdot h_1 \cdot S + \alpha^2 \cdot g_1 * \cdot g_1 \cdot J \qquad (14)$$

$$y_2 = \beta^2 \cdot g_2 * \cdot h_2 \cdot S + \beta^2 \cdot g_2 * \cdot g_2 \cdot J \qquad (15)$$

Therefore, the output signal z of the subtractor 108 is represented as follows:

$$\begin{aligned} z &= y_1 - y_2 \qquad (16) \\ &= (\alpha^2 \cdot g_1 * \cdot h_1 - \beta^2 \cdot g_2 * \cdot h_2) S + \\ &\quad (\alpha^2 \cdot g_1 * g_1 - \beta^2 \cdot g_2 * \cdot g_2) J \end{aligned}$$

Being a product of complex conjugates, each of the products $g_1 * \cdot g_1$ and $g_2 * \cdot g_2$ of Equation (16) is a real number, so that the interfering signals of the diversity branches 1 and 2 are rotated to real axis and subtracted from each other. If the result of this subtraction is zero, it implies that the interfering signals are combined together in opposite phases and they are completely cancelled out each other. Otherwise, part of the interfering signals remains as residual interference which is represented by the second term of Equation (16). By denoting this term by $\xi$, the residual interference is given by:

$$\xi = (\alpha^2 \cdot g_1 * g_1 - \beta^2 \cdot g_2 * \cdot g_2) J \qquad (17)$$

Substituting Equations (5) and (6) into Equation (17) yields:

$$\begin{aligned} \xi &= \left\{ \frac{g_1 * \cdot g_1}{h_1 * \cdot h_1 \cdot S^2 + g_1 * \cdot g_1 \cdot J^2} - \frac{g_2 * \cdot g_2}{h_2 * \cdot h_2 \cdot S^2 + g_2 * \cdot g_2 \cdot J^2} \right\} J \qquad (18) \\ &= \left\{ \frac{\frac{1}{J^2}}{\frac{h_1 * \cdot h_1 \cdot S^2}{g_1 * \cdot g_1 \cdot J^2} + 1} - \frac{\frac{1}{J^2}}{\frac{h_2 * \cdot h_2 \cdot S^2}{g_2 * \cdot g_2 \cdot J^2} + 1} \right\} J \end{aligned}$$

The term $h_1 * \cdot h_1 \cdot S^2$ represents the power of the desired signal at the output of diversity branch 1 and the term $g_1 * \cdot g_1 \cdot J^2$ the power of the interfering signal at the diversity branch 1. Likewise, the terms $h_2 * \cdot h_2 \cdot S^2$ and $g_2 * \cdot g_2 \cdot J^2$ represent the power of the desired signal and the power of the interfering signal at the 22 diversity branch 2, respectively. Equation (18) can therefore be rewritten as:

$$\xi = \left\{ \frac{1}{(D/U)_1 + 1} - \frac{1}{(D/U)_2 + 1} \right\} \frac{1}{J} \qquad (19)$$

where $(D/U)_1$ and $(D/U)_2$ are the desired-to-undesired signal ratios at the diversity branches 1 and 2, respectively. It is seen that the residual interference is reduced to zero only when $(D/U)_1$ is equal to $(D/U)_2$.

Since the output signal z of the power-inversion adaptive array is obtained at the output of the subtractor 108 and is given by Equation (16), the first term of this Equation is concerned with the desired signal S which includes components $g_1 * \cdot h_1$ and $g_2 * \cdot h_2$. These components are not real numbers on the complex plane, but vectors which vary randomly with time. Otherwise stated, maximum-ratio combining is not used for the desired signal.

In the absence of interfering signals J, the outputs of the correlators 105 and 106 represent the correlations between the desired signal components of the diversity branches 1 and 2 and maximum ratio combining is provided at the output of the adder 107 for the desired signal. As a result, when interfering signals are not present the switch 110 is operated to select the output of adder 107, so that the receiver operates in a normal diversity mode and adaptive equalizer 111 operates to remove multipath fading distortion.

The FIG. 1 prior art interference canceller operates properly only if the D/U ratio is of negative value. If the D/U ratio is positive, a prior art interference canceller shown in FIG. 3 would be a solution. This prior art system is the diversity receiver proposed by Peter Monsen and described in a paper "MMSE Equalization of Interference on Fading Diversity Channels", IEEE Transactions on Communications, Vol. COM-32, No. 1, January 1984, pp. 5–12. The configuration of this prior art system is similar to that of a decision feedback equalizer in which the forward filter has only one complex multiplier and the backward filter is dispensed with. As illustrated, the prior art interference canceller includes two complex multipliers 311 and 312, correlators 313 and 314, an adder 315 for combining the outputs of the complex multipliers 311, 312, a decision circuit 316 for making a decision on the output of the adder 315, and a subtractor 317 for providing a subtraction between the input and output signals of the decision circuit 316.

The operation of this prior art interference canceller is as follows. The desired signal S from source 301 is propagated through a fading channel 303 of transfer coefficient $h_1$ to the diversity branch 1 and through a fading channel 304 of transfer coefficient $h_2$ to the diversity branch 2. Similarly, the interfering signal J from source 302 is propagated through a fading channel 305 of transfer coefficient $g_1$ to the diversity branch 1 on the one hand, and propagated through a fading channel 306 of transfer coefficient $g_2$ to the diversity branch 2 on the other.

Equations (1) and (2) described previously are used to represent the signals $r_1$ and $r_2$ at the diversity branches 1 and 2. After being multiplied in multipliers 311 and 312 by weight coefficients $w_1$ and $w_2$ supplied from the correlators 313, 314 and combined together by the adder 315, an output signal y is produced in the form:

$$y = (w_1 \cdot h_1 + w_2 \cdot h_2)S + (w_1 \cdot g_1 + w_2 \cdot g_2)J \qquad (20)$$

If there is no decision error, the signal y is equal to the transmitted signal S. Thus, the output signal $\epsilon$ of the subtractor 107 is given by the following Equation:

$$\begin{aligned} \epsilon &= y - S \\ &= (w_1 \cdot h_1 + w_2 \cdot h_2 - 1)S + (w_1 \cdot g_1 + w_2 \cdot g_2)J \end{aligned} \qquad (21)$$

Applying the orthogonality principle to each of the signals at the diversity branches 1 and 2 yields the following;

$$E = [r_1^* \cdot \epsilon] = 0 \qquad (22)$$

$$E = [r_2^* \cdot \epsilon] = 0 \qquad (23)$$

Substituting Equations (1), (2) and (21) into Equations (22) and (23) results in the following Normal (Wiener-Hopp) equations:

$$w_1(h_1^* \cdot h_1 \cdot S^2 + g_1^* \cdot g_1 J^2) + w_2(h_1^* \cdot h_2 \cdot S^2 + g_1^* \cdot g_2 \cdot J^2) = h_1^* \cdot S^2 \qquad (24)$$

$$w_1(h_2^* \cdot h_1 \cdot S^2 + g_2^* \cdot g_1 J^2) + w_2(h_2^* \cdot h_2 \cdot S^2 + g_2^* \cdot g_2 \cdot J^2) = h_2^* \cdot S^2 \qquad (25)$$

By dividing Equations (24) and (25) by $S^2$ and denoting the reciprocal of the D/U ratio at the sources of desired and interfering signals and representing the reciprocal by:

$$\eta = S^2/J^2 \qquad (26)$$

Equations (24) and (25) can be rewritten as:

$$w_1(h_1^* \cdot h_1 + g_1^* \cdot g_1 \cdot \eta) + w_2(h_1^* \cdot h_2 \cdot S^2 + g_1^* \cdot g_2 \cdot \eta) = h_1^* \qquad (27)$$

$$w_1(h_2^* \cdot h_1 + g_2^* \cdot g_1 \cdot \eta) + w_2(h_2^* \cdot h_2 \cdot S^2 + g_2^* \cdot g_2 \cdot \eta) = h_2^* \qquad (28)$$

By setting the following Equation:

$$a(i,j) + e, \text{dus } \Delta h_i^* \cdot h_j + g_i^* \cdot g_j \eta \qquad (29)$$

Equations (27) and (28) can be written into matrix form as follows:

$$\begin{bmatrix} \alpha(1,1) & \alpha(1,2) \\ \alpha(2,1) & \alpha(2,2) \end{bmatrix} \begin{bmatrix} w_1 \\ w_2 \end{bmatrix} = \begin{bmatrix} h_1^* \\ h_2^* \end{bmatrix} \qquad (30)$$

The solutions of the simultaneous equations minimize the mean square value of the error $\epsilon$ and maximize the signal-to-interference-plus-noise ratio (SINR), so that interference is cancelled without substantial loss of signal. Such solutions are given by the following Equations:

$$w_1 = g_2/(h_1 \cdot g_2 - h_2 \cdot g_1) \qquad (31)$$

$$w_2 = -g_2/(h_1 \cdot g_2 - h_2 \cdot g_1) \qquad (32)$$

By taking correlations between $\epsilon$ and the outputs of the diversity branches in the correlators 313 and 314 to control the weight coefficients $w_1$ and $w_2$, the mean square error $E[\epsilon^* \cdot \epsilon]$ is minimized. While the correlations are described as an analog process, the Least Mean Square (LMS) algorithm as proposed by Bernard Widrow can be used for digitally processing the correlations by updating weight coefficients $w_i$.

For proper operation of adaptive equalization, the time taken for convergence is of primary concern. If the learning time for convergence is sufficient, the eigen value $\lambda$ of the correlation matrix of Equation (30) can be used. Since the correlation matrix of the left term of Equation (30) can be represented as:

$$\begin{bmatrix} \alpha(1,1) & \alpha(1,2) \\ \alpha(2,1) & \alpha(2,2) \end{bmatrix} \qquad (33)$$

the eigen value I is obtained from the following eigen value equation:

$$|\Phi - \lambda \cdot I| = 0 \qquad (34)$$

where I is a unit matrix.

$$\begin{bmatrix} \alpha(1,1) - \lambda & \alpha(1,2) \\ \alpha(2,1) & \alpha(2,2) - \lambda \end{bmatrix} = 0 \qquad (35)$$

The solution of Equation (35) is given as follows:

$$\lambda_{max} = \frac{1}{2} \{ A + (A^2 - 4B)^{1/2} \} \qquad (36)$$

$$\lambda_{min} = \frac{1}{2} \{ A - (A^2 - 4B)^{1/2} \} \qquad (37)$$

where, $$A = (h_1^* \cdot h_1 + h_2^* \cdot h_2) + (g_1^* \cdot g_1 + g_2^* \cdot g_2)\eta \qquad (38)$$

$$B = (h_1 \cdot g_2 - h_2 \cdot g_1)^* \cdot (h_1 \cdot g_2 - h_2 \cdot g_1)\eta \qquad (39)$$

Figure 3:
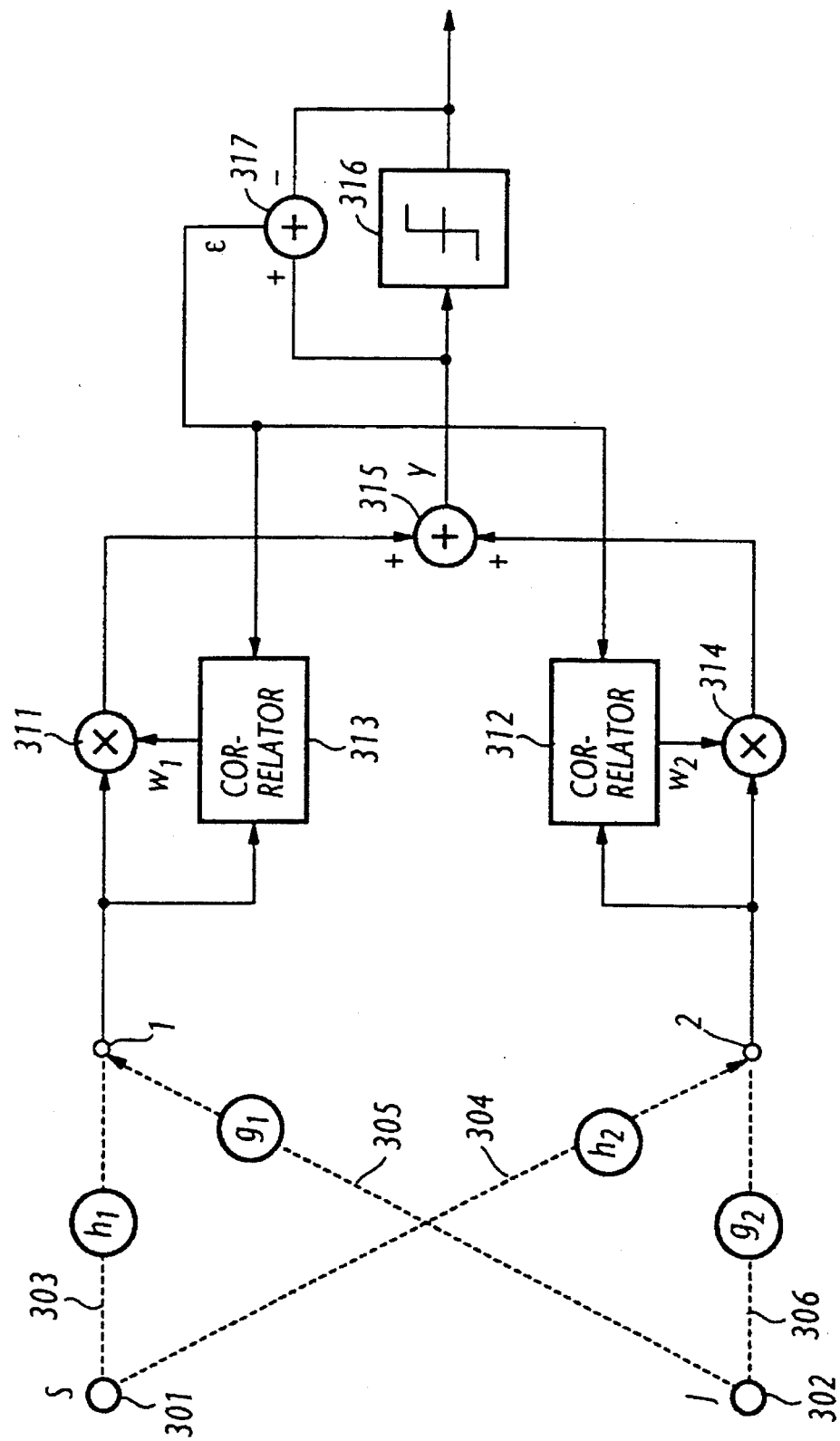
FIG. 3 is a block diagram of a second prior art interference canceller.

If all the complex transfer coefficients of FIG. 3 are of unity value of real number, Equation (36) gives the maximum eigen value as follows:

$$\lambda_{max} = 2(1 + \eta) = 2\{1 + (J^2/S^2)\} \qquad (40)$$

Equation (40) implies that the maximum eigen value increases with an increase in the level of the interfering signal J.

While the prior art interference canceller of FIG. 1 is capable of interference cancellation if the D/U ratios are negative, as is apparent from Equation (19), complete cancellation of interference is not possible if the D/U ratios of the diversity branches differ from each other. In radio transmission systems where the transfer coefficients are constantly changing due to fading, the D/U ratios of the diversity branches have a very low likelihood of assuming equal values. On the other hand, with the prior art of LMS interference canceller, FIG. 3, the mean square error adopts a downwardly convexed quadric surface so that the partial differential coefficients of second order of the weight coefficients assume a maximum eigen value. As a result, with an increase in the eigen value the plane of the decision error adopts the shape of a sharper quadric surface.

The update coefficient $\mu$ of the LMS algorithm is normally set at a sufficiently small value. However, as the quadric error surface becomes sharper, the amount of weight coefficient to be updated increases to such an extent that adaptive convergence is no longer possible. It is generally known that the update coefficient $\mu$ must satisfy the following condition:

$$0 < \mu < 2/\lambda_{max} \qquad (41)$$

As a result, for a strong interfering signal, the maximum eigen value $\lambda_{max}$ of the correlation matrix increases correspondingly and Equation (41) cannot be met. If the update coefficient m is set at a low value to satisfy Equation (41), the convergence speed will decrease. Therefore, the LMS interference canceller cannot be used in applications where the D/U ratio is negative.

Figure 4:
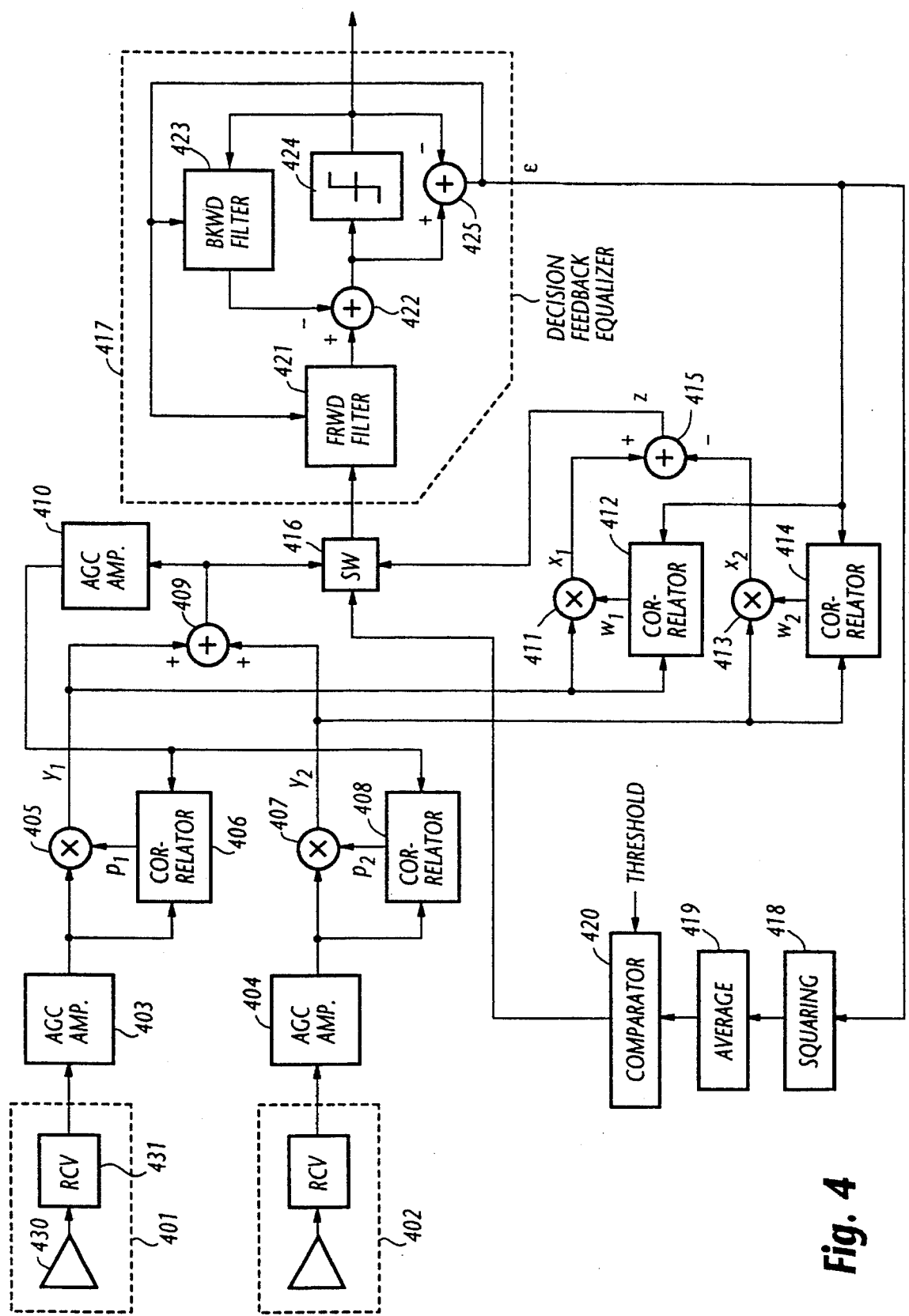
FIG. 4 is a block diagram of an interference canceller according to a first embodiment of the present invention.

Referring now to FIG. 4, there is shown an interference canceller according to a first embodiment of the present invention. The interference canceller comprises first and second diversity branches 401 and 402. Each diversity branch is formed by an antenna 430 and a radio-frequency receiver 431. The output of first diversity branch 401 is applied to an AGC amplifier 403 where the amplitude of the signal is normalized. The output of amplifier 403 is applied to the first input of a complex multiplier 405 as well as to a correlator 406. Correlator 406 determines the correlation between the output of AGC amplifier 403 and output signal R(n) of an AGC amplifier 410 to supply a correlation output signal, or weight coefficient $p_1$, to the second input of complex multiplier 405. The weight coefficient $p_1$ is given by the following relation:

$$p_1(n+1) = \{p_1(n) + \xi \cdot r_1^* \cdot R(n)\}(1-\xi) \quad (42)$$

where n is the indicator or digital samples and x is the update coefficient. Complex multiplier 405 provides multiplication on the input signals applied thereto and supplies a complex product $y_1$ to the first input of an adder, or diversity combiner 409. Likewise, the output of second diversity branch 402 is applied to an AGC amplifier 404 where the amplitude of the second diversity signal is normalized. The output of amplifier 404 is applied to the first input of a complex multiplier 407 as well as to a correlator 408, which determines the correlation between the outputs of AGC amplifiers 404 and 410 to supply a weight coefficient $p_2$ to the second input of complex multiplier 407. The weight coefficient $p_2$ is given by:

$$p_2(n+1) = \{p_2(n) + \xi \cdot r_2^* \cdot R(n)\}(1-\xi) \quad (43)$$

Complex multiplier 407 provides multiplication on the input signals applied thereto and supplies a complex product $y_2$ to the second input of the adder 409 where it is diversity-combined with the signal $y_1$ to produce a sum signal. The sum signal is normalized by the AGC amplifier 410 to produce an output signal R(n) for coupling to the correlators 406 and 408.

Figure 5:
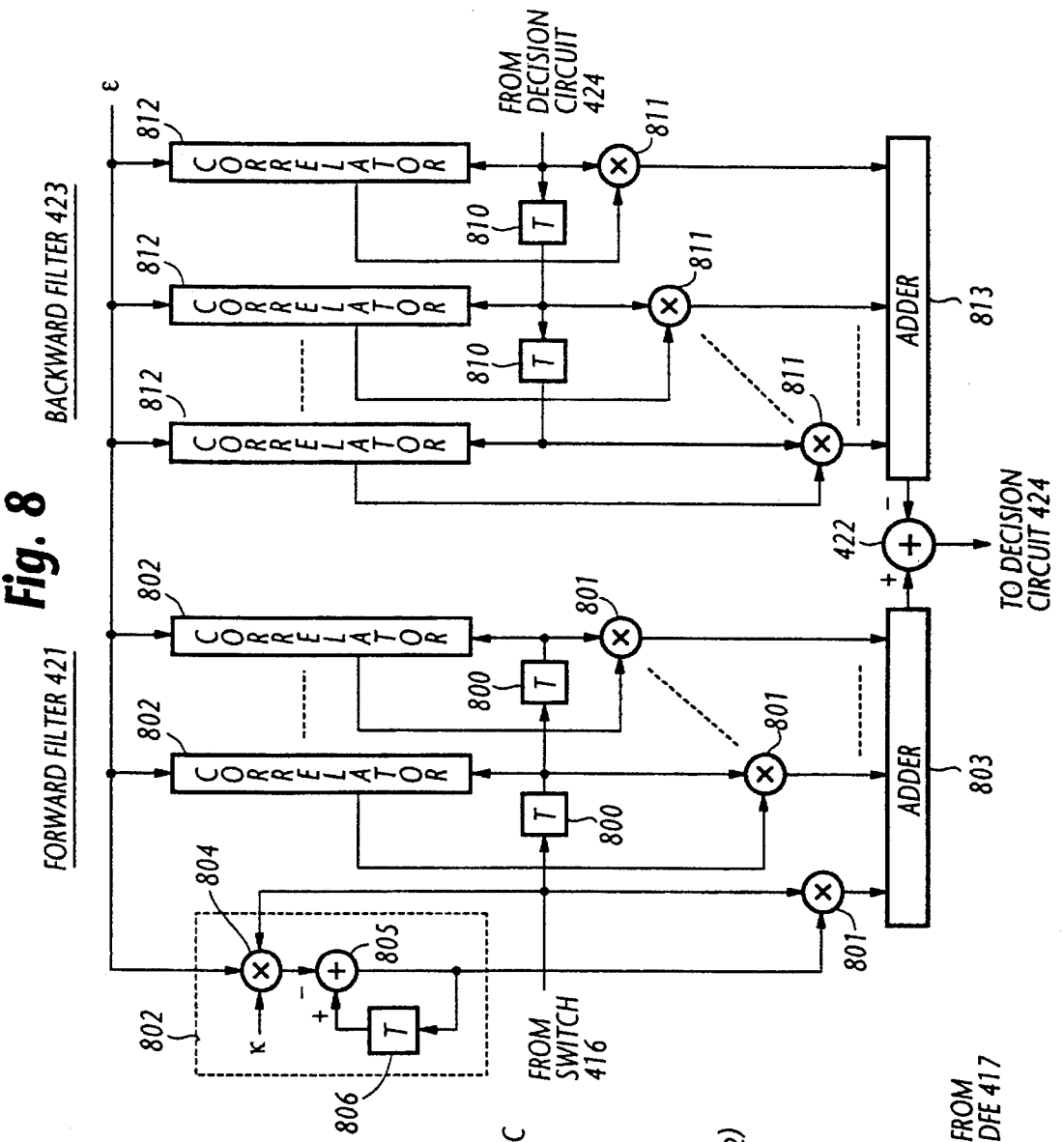
FIG. 5 is a circuit diagram of each correlator of FIG. 4 which is used in the first correlation stage of the canceller of FIG. 4.

As shown in detail in FIG. 5, each of the correlators 406 and 408 comprises a complex conjugate 500 through which the output of AGC amplifier 403 or 404 is coupled to a complex multiplier 501 where it is multiplied with the output signal R(n) of AGC amplifier 410, producing a signal $r_i^* \cdot R(n)$. The output of multiplier 501 is coupled through a DC amplifier 502 of gain $\xi$ (or update coefficient) to an adder 503 whose output is connected back through a sample-delay element 504 to the adder 503 where it is summed with the output of the first amplifier and supplied to a second DC amplifier 505 of gain $(1-\xi)$ whose output is applied to the complex multiplier 405 or 407. Each of the correlators 406 and 408 has a time constant τ which is given by $\tau = T/\xi$, where T is the interval at which the original analog signal is sampled into digital form.

The output of complex multiplier 405 is applied to the first input of a complex multiplier 411 as well as to a correlator 412 where the correlation is taken between the multiplier 405 output and an error signal $\epsilon$ from an adaptive equalizer, or decision feedback equalizer 417 to supply a weight coefficient $w_1$ to the second input of multiplier 411. Similarly, the output of complex multiplier 407 is applied to the first input of a complex multiplier 413 as well as to a correlator 414 where the correlation is taken between the multiplier 407 output and the error signal $\epsilon$ to supply a weight coefficient $w_2$ to the second input of multiplier 413. The difference between the outputs of complex multipliers 411 and 413 is detected by a subtractor 415 to produce a difference signal z.

The outputs of adder 409 and subtractor 415 are supplied to a switch 416, which selects one of these signals in response to a control signal applied thereto. If an interfering signal is not present, the output of adder 409 is selected, and if present, the output of subtractor 415 is selected. This control signal is derived from the power of error signal e from the decision feedback equalizer 417 by a squaring circuit 418 where the error is squared, and an average circuit 419 where the squared error is averaged over time. The output of average circuit 419 is compared with a threshold voltage in a comparator 420 to cause the switch 416 to select the output of adder 409 if the threshold is not exceeded. If the threshold is exceeded, the switch 416 is caused to select the output of subtractor 415. The signal selected by the switch 416 is applied to the forward filter 421 of the decision feedback equalizer 417.

The output of the forward filter 421 is applied to a subtractor 422 where the difference between it and the output of the backward filter 423 is determined for the input of decision circuit 424. Decision circuit 424 makes a decision on the output of subtractor 422 to produce a decision output, which is fed back to the backward filter 423. The input and output signals of the decision circuit 424 are used by the error detector 425 to detect the difference, or error signal e. This error signal is also used by the backward filter 423. Backward filter 423 is of the transversal type as in the case of the forward filter to update its tap weight coefficients in a manner similar to the forward filter 421.

The tap weight coefficients of both forward and backward filters are adaptively updated according to the least mean square (LMS) algorithm so that the means square value of the decision error $\epsilon$ is reduced to a minimum.

The operation of the interference canceller of FIG. 4 in the presence of an interfering signal will be described below with reference to FIG. 6. It is assumed that a desired signal S is propagated over a first fading channel 601 of transfer coefficient $h_1$ to the first diversity branch 401 and over a second fading channel 602 of transfer coefficient $h_2$ to the second diversity branch 402 and that an interfering signal J is propagated over a first fading channel 603 of transfer coefficient $g_1$ to the first diversity branch 401 and over a second fading channel 604 of transfer coefficient $g_2$ to the second diversity branch 402.

The signals $r_1$ and $r_2$ at the outputs of diversity branches 401 and 402 are given by Equations (1) and (2), and the output signals $r_1'$ and $r_2'$ of AGC amplifiers 403 and 404 are given by Equations (3) and (4) as described previously. AGC amplifiers 403 and 404 have normalizing constants a and B as given by Equations (5) and (6), respectively. Complex multipliers 405, 407, correlators 406, 408, adder 409 and AGC amplifier 410 comprise the same correlation circuitry of a power-inversion adaptive array as that of the FIG. 1 prior art. Therefore, proper phase control operation is provided on the interfering signals when the D/U ratio is of negative value as in the case of the FIG. 1 prior art.

The output signal $r_1'$ of AGC amplifier 403 has a signal vector component $h_1' \cdot S$ and an interference vector component $g_1' \cdot J$ as indicated within a circle 605, and the output signal $r_2'$ of AGC amplifier 404 has a signal vector component $h_2' \cdot S$ and an interference vector component $g_2' \cdot J$ as indicated within a circle 606, where $h_1' = \alpha \cdot h_1$, $h_2' = \beta \cdot h_2$, $g_1' = \alpha \cdot g_1$, $g_2' = \beta \cdot g_2$. If the vector angles of the interference components $g_1' \cdot J$ and $g_2' \cdot J$ differ from each other as illustrated, the correlators 406 and 408 respectively produce weight coefficients $p_1$ and $p_2$ of such magnitudes and phase angles that when signals $r_1'$ and $r_2'$ are multiplied with these coefficients by multipliers 405 and 407, there is a phase match between the interference vector components $p_1 \cdot r_1' \cdot J$ and $p_2 \cdot r_2' \cdot J$ as indicated within circles 607 and 608, respectively.

The interference vector components $p_1 \cdot r_1' \cdot J$ and $p_2 \cdot r_2' \cdot J$ may assume different magnitudes. The difference between the magnitudes of these interference vectors increase with the difference between the D/U ratios of the two diversity branches 401 and 402. As indicated in circles 607 and 608, the interference vector components are in-phase combined by adder 409 so that there is an increase in the ratio of the magnitude of the combined interfering signal J in comparison to the magnitude of the desired signal S. Therefore, it can be considered that a signal substantially corresponding to the interfering signal is detected at the output of adder 409. Since the output of adder 409 is normalized by the AGC amplifier 410 and applied to the correlators 406 and 408, where the signal is converted to weight coefficients $p_1$ and $p_2$ of the form:

$$p_1 = \alpha \cdot g_1^* \quad (44)$$

$$p_2 = \beta \cdot g_2^* \quad (45)$$

the output signals $y_1$ and $y_2$ of complex multipliers 405 and 407 are given by:

$$y_1 = \alpha^2 \cdot g_1^* \cdot h_1 \cdot S + \alpha^2 \cdot g_1^* \cdot g_1 \cdot J \quad (46)$$

$$y_2 = \beta^2 \cdot g_2^* \cdot h_2 S + \beta^2 \cdot g_2^* \cdot g_2 \cdot J \quad (47)$$

By setting the following relations, $$\rho_1 + e, dus \, \Delta\alpha^2 \cdot g_1^* \cdot h_1 \quad (48)$$

$$\rho_2 + e, dus \, \Delta\beta^2 \cdot g_2^* \cdot h_2 \quad (49)$$

$$\gamma_1 + e, dus \, \Delta\alpha^2 \cdot g_1^* \cdot g_1 \quad (50)$$

$$\gamma_2 + e, dus \, \Delta\beta^2 \cdot g_2^* \cdot g_2 \quad (51)$$

Equations (46) and (47) can be rewritten as:

$$y_1 = \rho_1 \cdot S + \gamma_1 \cdot J \quad (52)$$

$$y_2 = \rho_2 \cdot S + \gamma_2 \cdot J \quad (53)$$

According to the present invention, the signals $y_1$ and $y_2$ from complex multipliers 405, 407 are then multiplied by weight coefficients $w_1$ and $w_2$, respectively, in complex multipliers 411 and 413, producing vector products $x_1 = y_1 \cdot w_1$ and $x_2 = y_2 \cdot w_2$ (see vectors in circles 609 and 610)

$$\begin{aligned} z &= y_1 \cdot w_1 - y_2 \cdot w_2 \\ &= (w_1 \cdot \rho_1 - w_2 \cdot \rho_2)S + (w_1 \cdot \gamma_1 - w_2 \cdot \gamma_2)J \end{aligned} \quad (54)$$

Returning to FIG. 4, the signal z is applied to the forward filter 421 of the decision feedback equalizer where the intersymbol interference caused by the precursor (leading edge) of the channel's impulse response is removed. The backward filter 423 removes the intersymbol interference caused by the postcursor (trailing edge) of the channel's impulse response from the decision output. The difference between the outputs of forward and backward filters 421 and 423 is detected by subtractor 422 for application to decision circuit 424.

Each of the correlators 412 and 414 is implemented as shown in FIG. 7 according to the LMS algorithm. Each correlator includes a multiplier 700 where the input signal from AGC amplifier 403 or 404 is multiplied with an update coefficient μ (or stepsize) and the error signal e from the DFE 417. The output of multiplier 700 is applied to a subtractor 701 to which the output signal of subtractor 701 is applied through a sample-delay element 702. The output signal of subtractor 701 is applied as the weight coefficient $p_1$ or $p_2$ to the multiplier 411 or 413. The time constant $\tau_\mu$ of the updating loop of each of these correlators 412, 414 is given by $\tau_\mu = T/\mu$.

FIG. 8 shows details of the forward and backward filters 421 and 423 of the decision feedback equalizer. Forward filter 421 comprises a tapped delay line formed by sample-delay elements 800 which are cascade-connected to form successive taps from the output of switch 416. A plurality of tap-weight multipliers 801 are connected respectively to the taps of the delay line for respectively multiplying tap signals on the delay line with tap-weight coefficients supplied from corresponding correlators 802 which are also connected respectively to the delay-line taps. The outputs of tap-weight multipliers 801 are summed by an adder 803 and applied to the subtractor 422. Each correlator 802 comprises a multiplier 804 which multiplies the corresponding tap signal with an update coefficient (or stepsize) κ and the error ε from the error detector 425. The output of multiplier 804 is applied to a subtractor 805 where it is subtracted from a version of the output of subtractor 805 that was delayed by a sample-delay element 806. The output of subtractor 805 is supplied to the corresponding tap-weight multiplier 801 as a tap-weight coefficient.

Backward filter 423 is in a similar configuration to the forward filter in that it includes a tapped delay line formed by sample-delay elements 810 which are cascade-connected to form successive taps from the output of decision circuit 424. A plurality of tap-weight multipliers 811 are connected respectively to the taps of the delay line for respectively multiplying tap signals on the delay line with tap-weight coefficients supplied from corresponding correlators 812 which are also connected respectively to the delay-line taps. The outputs of tap-weight multipliers 811 are summed by an adder 813 and applied to the subtractor 422. Each correlator 812 is identical to the correlator 802 of the forward filter. The time constant $\tau_\kappa$ of the updating loop of each of the forward and backward filters is given by $\tau_\kappa = T/\kappa$.

Figure 6:
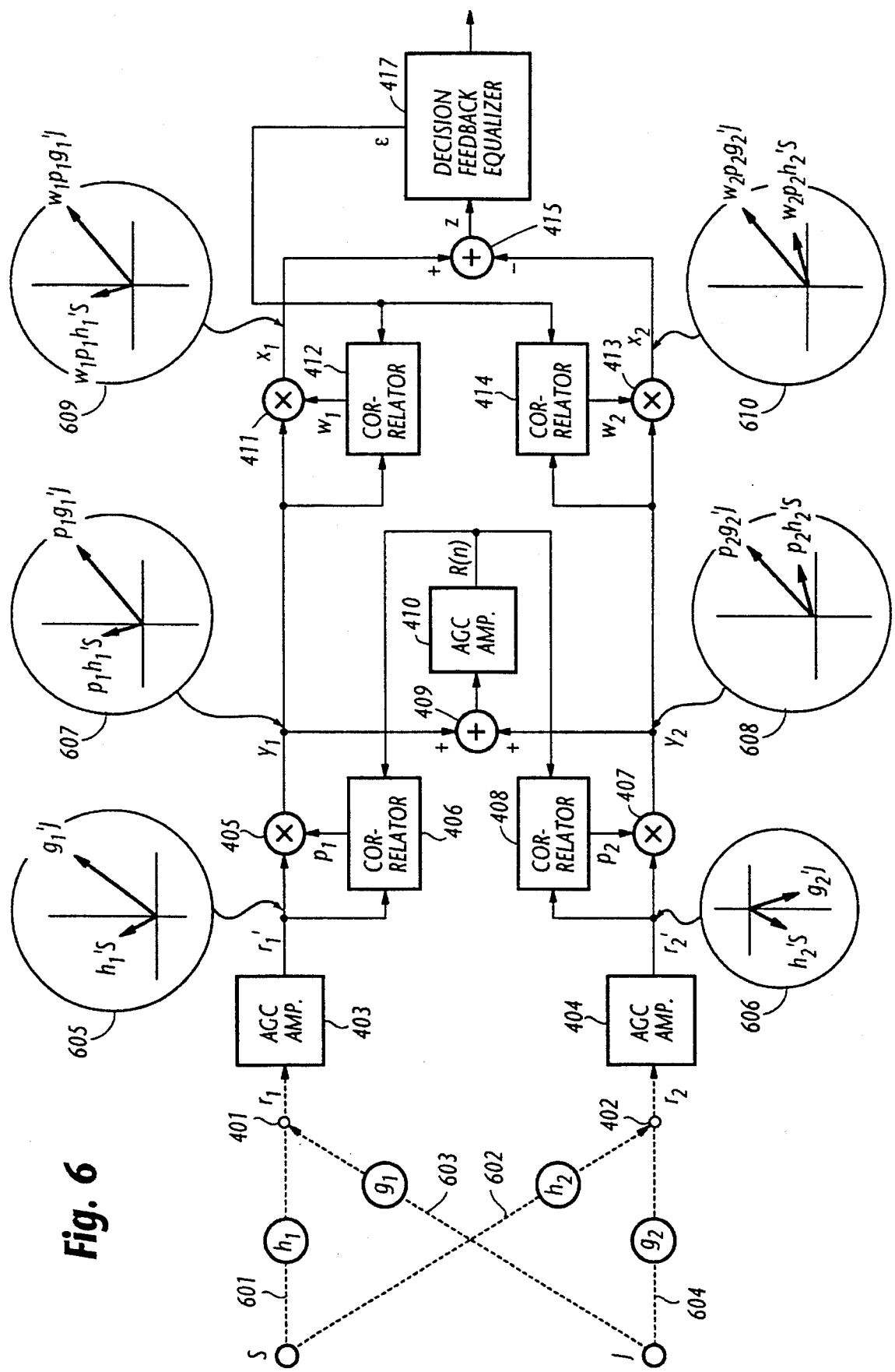
FIG. 6 is a block diagram duplicating a part of FIG. 4 for describing the operation of the canceller of the first embodiment in the presence of an interfering signal.

The following is a mathematical analysis of the interference canceller of FIG. 6. For simplicity, it is assumed that there is no intersymbol interference caused by multipath returns. Under this assumption, the tap weight coefficient at the reference tap of the forward filter 421 is a real value 1 and the tap weight coefficients of the backward filter 423 are zero. If there is no decision error, the decision output is equal to the transmitted signal S. Therefore, the decision error ε from error detector 425 is represented by:

$$\begin{aligned} \epsilon &= z - S \\ &= (w_1 \cdot \rho_1 - w_2 \cdot \rho_2 - 1)S + (w_1 \cdot \gamma_1 - w_2 \cdot \gamma_2)J \end{aligned} \quad (55)$$

The error signal ε is fed back to the correlators 412 and 414 to determine its correlation with the inputs of multipliers 411 and 413. Thus, the error signal is not only used for adaptively updating the tap weight coefficients of the forward and backward filters, but used as a weight coefficient for combining the outputs of the diversity branches.

The use of the error signal of the adaptive equalizer 417 for the diversity combining by correlators 412, 414 as well as for its own adaptive equalization implies that the interference canceller has two MMSE (minimum mean square error) control systems and these control systems are likely to race for priority. If a variation should occur in the interfering signal and correlators 412, 414 respond to it, a corresponding variation will result in the signal at the input of equalizer 417. If the equalizer quickly responds to the input variation, the error signal will be varied accordingly, and the MMSE control of the correlators 412, 414 will be disturbed.

Such undesirable racing conditions can be avoided by introducing a difference between the response times of these MMSE control systems. More specifically, the diversity combining MMSE control is set at a speed higher than the control speed of the adaptive equalization. This is done by setting the time constants $\tau_\mu$ of correlators 412 and 414 at values smaller than the time constants $\tau_\kappa$ of the tap-weight updating correlators of both filters of decision feedback equalizer 417 (i.e., $\kappa > \mu$).

According to the analog MMSE algorithm the output signals $w_1$ and $w_2$ of correlators 412 and 414 are given by:

$$w_1 = E[-(y_1^* \cdot \epsilon) dt] \tag{56}$$

$$w_2 = E[-(y_2^* \cdot \epsilon) dt] \tag{57}$$

If the LMS digital process is preferred as represented in FIG. 7, the coefficients $w_1$ and $w_2$ are obtained as follows:

$$w_{1(n+1)} = w_{1(n)} - \mu \cdot y_1^* \cdot \epsilon \tag{58}$$

$$w_{2(n+1)} = w_{2(n)} - \mu \cdot y_2^* \cdot \epsilon \tag{59}$$

The minimum mean square error (MMSE) solution can be derived from the orthogonality principle by setting:

$$E[y_1^* \cdot \epsilon] = 0 \tag{60}$$

$$E[y_2^* \cdot \epsilon] = 0 \tag{61}$$

The following Normal Equations are obtained for the weight coefficients $w_1$ and $w_2$:

$$w_1(\rho_1^* \cdot \rho_1 \cdot S^2 + \gamma_1^2 \cdot J^2) - w_2(\rho_1^* \cdot \rho_2 \cdot S^2 + \gamma_1 \cdot \gamma_2 \cdot J_2) = \rho_1^* \cdot S^2 \tag{62}$$

$$w_1(\rho_2^* \cdot \rho_1 \cdot S^2 + \gamma_2 \cdot J^2) - w_2(\rho_2^* \cdot \rho_2 \cdot S^2 + \gamma_2^2 \cdot J_2) = \rho_2^* \cdot S^2 \tag{63}$$

Solving the Normal Equations gives the following ideal solutions:

$$w_1 = \gamma_2 / (\rho_1 \cdot \gamma_2 - \rho_2 \cdot \gamma_1) \tag{64}$$

$$w_2 = \gamma_1 / (\rho_1 \cdot \gamma_2 - \rho_2 \cdot \gamma_1) \tag{65}$$

Substituting $w_1$ and $w_2$ of Equations (64) and (65) into Equation (54) provides the output signal z as follows:

$$z = (\rho_1 \cdot S + \rho_1 \cdot J) \frac{\gamma_2}{\rho_1 \cdot \gamma_2 - \rho_1 \cdot \gamma_1} - \tag{66}$$

$$(\rho_2 \cdot S + \gamma_2 \cdot J) \frac{\gamma_1}{\rho_1 \cdot \gamma_2 - \rho_2 \cdot \gamma_1} = S$$

It is seen from Equation (66) that the interfering signal J is completely nulled in the subtractor 415 and the output of this subtractor is a replica of the desired signal S containing no trace of the interfering signal. In other words, there is a complete match between the phase and amplitude of the interfering vector $w_1 \cdot p_1 \cdot g_1' \cdot J$ indicated in circle 609 in FIG. 6 and those of the interfering vector $w_2 \cdot p_2 \cdot g_2' \cdot J$ indicated in circle 610 at the inputs of the subtractor 415.

In contrast, interference is not completely nulled in subtractor 508 of the FIG. 1 prior art and remains at the output of this subtractor as residual interference as represented by the second term of Equation (16) as long as a difference exists between the D/U ratios of the first and second diversity branches 1 and 2.

Figure 9:
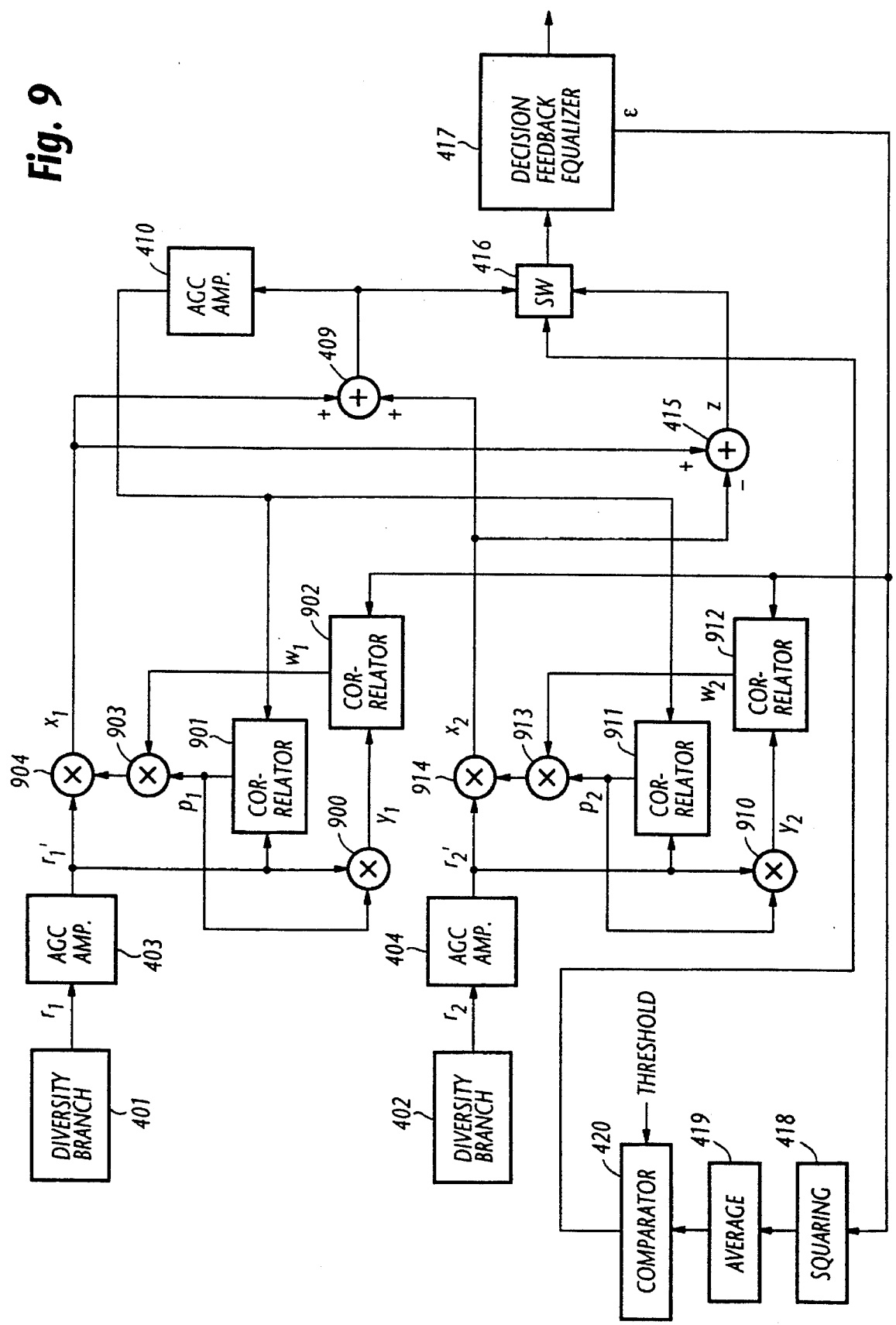
FIG. 9 is a block diagram of an interference canceller according to a modified embodiment of the present invention.

An alternative embodiment of the present invention is shown in FIG. 9 in which parts corresponding in significance to those of FIG. 4 are marked with the same numerals as those used in FIG. 4. According to the modified embodiment, the output of AGC amplifier 403 is connected to a multiplier 900 and a correlator 901. Correlator 901 determines the correlation between the outputs of AGC amplifiers 403 and 410 to produce a weight coefficient $p_1$. The signal $p_1$ is applied to the multiplier 900 where it is multiplied with the output signal $r_1'$ of AGC amplifier 403 to produce an output signal $y_1$. Signal $y_1$ is applied to a correlator 902 where the correlation between it and the decision error $\epsilon$ is taken to produce a weight coefficient $w_1$. The coefficients $p_1$ and $w_1$ are multiplied with each other in a multiplier 903 whose output is applied to a multiplier 904, where the product $p_1 \cdot w_1$ is multiplied with the signal $r_1'$ to produce an output signal $= p_1 \cdot w_1 \cdot r_1'$.

In like manner, the output of AGC amplifier 404 is connected to a multiplier 910 and a correlator 911. Correlator 911 determines the correlation between the outputs of AGC amplifiers 404 and 410 to produce a weight coefficient $p_2$. The signal $p_2$ is applied to the multiplier 910 where it is multiplied with the output signal $r_2'$ from AGC amplifier 404 to produce an output signal $y_2$. Signal $y_2$ is applied to a correlator 912 where the correlation between it and the decision error $\epsilon$ is taken to produce a weight coefficient $w_2$. The coefficients $p_2$ and $w_2$ are multiplied with each other in a multiplier 913 whose output is applied to a multiplier 914, where the product $p_2 \cdot w_2$ is multiplied with the signal $r_2'$ to produce an output signal $x_2 = p_2 \cdot w_2 \cdot r_2'$.

The output signals $x_1$ and $x_2$ of multipliers 904, 914 are supplied to the adder 409 where they are diversity-combined to produce a sum signal for coupling to the AGC amplifier 410 as well as to switch 416 and further applied to the subtractor 415 to produce a difference signal $z = p_1 \cdot w_1 \cdot r_1' - p_2 \cdot w_2 \cdot r_2'$.

If the interfering signal is stronger than the desired signal (i.e., D/U ratio is negative), the interference component is dominant in the output signal of diversity combiner 409. As a result, the AGC amplifier 409 normalizes the interference-dominant signal with the power of the interfering signal and produces a signal $R_j$ as given by Equation (11) described previously. Correlators 901 and 911 determine the correlations between $R_j$ and $r_1'$ and between $R_j$ and $r_2'$ to produce weight coefficient signals $p_1$ and $p_2$ which are respectively represented by Equations (44) and (45).

The following is a description of the performance of adaptive convergence of the present invention. Dividing both sides of the Normal Equations (62) and (64) by the power of desired signal ($S^2$) and representing the reciprocal of the D/U ratio as:

$$\eta \stackrel{\Delta}{=} \frac{J^2}{S^2} \tag{67}$$

gives the following Normal Equations:

$$w_I(\rho_1^* \cdot \rho_1 + \gamma_1^2 \cdot \eta) - w_2(\rho_1^* \cdot \rho_2 + \gamma_1 \cdot \gamma_2 \cdot \eta) = \rho_1^* \tag{68}$$

$$w_I(\rho_2^* \cdot \rho_1 + \gamma_2 \cdot \gamma_1 \cdot \eta) - w_2(\rho_2^* \cdot \rho_2 + \gamma_2^2 \cdot \eta) = \rho_2^* \tag{69}$$

By setting the following Equation, $$\phi(i,j) + e, dus \Delta \rho_i^* \cdot \rho_j + \gamma_i^* \cdot \gamma_j \cdot \eta \tag{70}$$

Equations (68) and (69) can be represented as:

$$\begin{bmatrix} \phi(1,1) & \phi(1,2) \\ \phi(2,1) & \phi(2,2) \end{bmatrix} \begin{bmatrix} w_1 \\ w_2 \end{bmatrix} = \begin{bmatrix} \rho_1^* \\ \rho_2^* \end{bmatrix} \tag{71}$$

The first term on the left side of Equation (71) is a correlation matrix. By representing the correlation matrix as $\psi$ and denoting its eigen values as $\lambda$, an eigen value equation is given as follows:

$$|\psi - \lambda \cdot I| = 0 \qquad (72)$$

where I is a unit matrix. Rewriting Equation (72) gives:

$$\begin{bmatrix} \phi(1,1) - \lambda & -\phi(1,2) \\ \phi(2,1) & -\phi(2,2) - \lambda \end{bmatrix} = 0 \qquad (73)$$

Solving Equation (73) for the eigen values gives:

$$\lambda_{max} = C + (C^2 - 4D)^{1/2}\}/2 \qquad (74)$$

$$\lambda_{min} = C - (C^2 - 4D)^{1/2}\}/2 \qquad (75)$$

where, $$C = (\rho_1^* \rho_1 - \rho_2^* \cdot \rho_2) + (\gamma_1^2 - \gamma_2^2)\eta \qquad (76)$$

$$D = -(\rho_1 \cdot \gamma_2 - \rho_2 \cdot \gamma_1)^* \cdot (\rho_1 \cdot \gamma_2 - \rho_2 \cdot \gamma_1)\eta \qquad (77)$$

Figure 10:
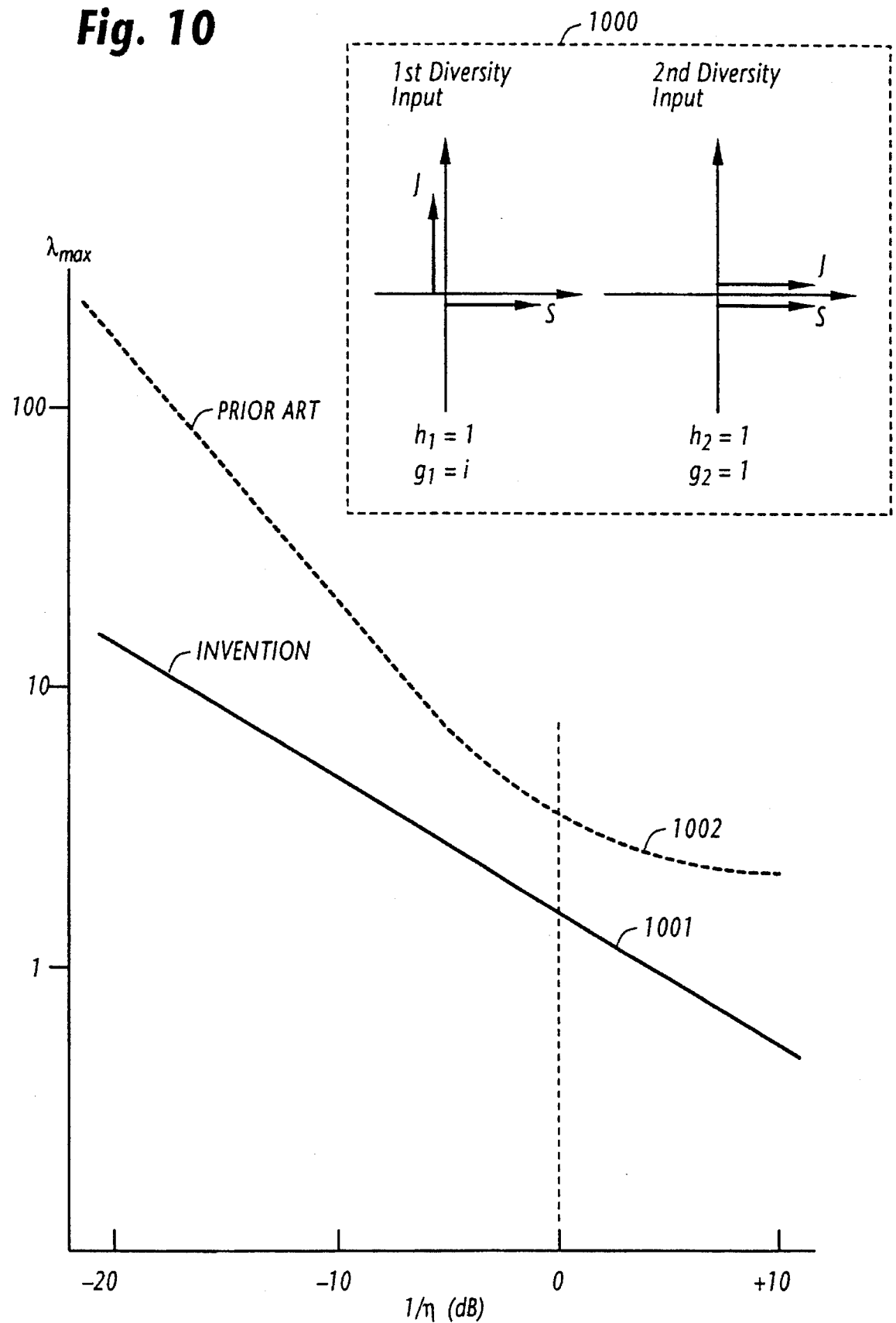
FIG. 10 is a plot of maximum eigen values as a function of D/U ratios for comparison between the convergence performance of the first embodiment of the present invention and that of the FIG. 3 prior art interference canceller.

Equations (74) and (75) can be used to compare the convergence performance of the present invention with that of the FIG. 3 prior art as graphically shown in FIG. 10 in which the eigen value $\lambda_{max}$ is plotted as a function of D/U ratios. A propagation model as indicated by vectors J and S in a rectangle 1000 in FIG. 10 is used for the evaluation. These vectors are represented by the following complex transfer coefficients for the first and second diversity branches:

$$h_1 = 1, g_1 = i \qquad (78)$$

$$h_2 = 1, g_2 = 1 \qquad (79)$$

where i is the imaginary part of a complex value. Thus, the imaginary part of the complex value for $g_1$ is equal to 1 and its real part 0. As illustrated, the desired and interfering signals S and J at the first diversity branch are orthogonal in phase, while at the second diversity branches they are in phase. These vectors are shown as having an equal magnitude. This corresponds to a case where D/U ratio ($=1/\eta$) is 0 dB.

The propagation model 1000 is applied to the present invention by substituting Equations (78) and (79) into Equations (5) and (6) and solving Equations (5) and (6) for the normalizing constants $\alpha$ and $\beta$ of the AGC amplifiers 403 and 404, respectively, as follows:

$$\alpha = \beta = \frac{1}{\sqrt{S^2 + J^2}} \qquad (80)$$

As it is seen from Equation (80), each normalizing constant is equal to the reciprocal of the root of the total power of the desired and interfering signals. To simplify the propagation model, the total signal power is normalized to 1. Note that D/U ratio remains unchanged since their power ratio is equal to D/U ratio. As a result, the following relation holds:

$$\alpha = \beta + e, dus \; \Delta 1 \qquad (81)$$

Substituting Equations (78), (79) and (81) into Equations (48), (49), (50) and (51) and solving $\rho_1$, $\rho_2$, $\gamma_1$, and $\gamma_2$, substituting these values into Equations (76) and (77) gives:

$$C = 0 \qquad (82)$$

$$D = -2h \qquad (83)$$

By substituting C and D of Equations (82) and (83) into Equation (74), the following maximum eigen value $\lambda_{max}$ is obtained:

$$\lambda_{max} = (2\eta)^{1/2} \qquad (84)$$

Using Equation (84), a solid line 1001 in FIG. 10 is a plot of eigen values of the present invention.

Next, the propagation model 1000 is applied to the FIG. 3 prior art by substituting the transfer coefficients of Equations (78) and (79) into Equations (38) and (39), giving the following relations:

$$A = 2(\eta + 1) \qquad (85)$$

$$B = 2\eta \qquad (86)$$

Substituting Equations (85) and (86) into Equation (36) gives the following maximum eigen value $\lambda_{max}$:

$$\lambda_{max} = \eta + (\eta^2 + 1)^{1/2} + 1 \qquad (87)$$

By plotting eigen values according to Equation (87) gives a broken-line curve 1002 for the second prior art.

It is apparent from the foregoing that the eigen values of the second prior art canceller are consistently larger than those of the present invention and the difference between them increases rapidly with increasing negative D/U ratios. Since the increase in eigen value sharpens the quadratic surface of means square errors and the update coefficient of the adaptive algorithm is maintained constant, tracking error increases due to an increase in amount to be updated for each updating cycle.

The increase in eigen value may cause the adaptive control to exhibit an oscillatory transient response rather than an exponential transient response. As described previously, in the case of LMS algorithm, the convergence requirement of Equation (41) must be satisfied between the update coefficient $\mu$ and the maximum eigen value $\lambda_{max}$. The adaptive convergence requirement of the present invention is given by Equation (88):

$$0 < \mu < \sqrt{2/\eta} \qquad (88)$$

while the adaptive convergence requirement of the second prior art is given by Equation (89):

$$0 < \mu < 2/(\eta + \sqrt{\eta^2 + 1} + 1) \qquad (89)$$

From the convergence stability point of view, the present invention is favorably compared with the second prior art. If the input signal is a QPSK signal with the signal-point intervals being set to 2, the best LMS update coefficient $\mu$ is known to be equal to 0.01. Thus, for adaptive convergence to work properly, the maximum value $\mu_{max}$ for update coefficients as given by the right side of Equations (88) and (89) must be smaller than 0.01. For comparison, the Table given below shows upper limit update coefficient values in the range between +10 dB and −30 dB of D/U ratios.

TABLE

| D/U (dB) | A | B |
|---|---|---|
| +10 | 4.4 | 0.95 |
| +5 | 2.5 | 0.85 |
| 0 | 1.4 | 0.59 |
| −5 | 0.79 | 0.26 |
| −10 | 0.45 | 0.095 |
| −15 | 0.25 | 0.031 |
| −20 | 0.14 | 0.0099 |
| −25 | 0.079 | 0.0031 |
| −30 | 0.045 | 0.00099 | where, A and B are upper limit values $\mu_{max}$ of the present invention and the second prior art, respectively.

Although the Table shows that the upper limit update coefficients $\mu_{max}$ of the convergence requirement $0 < \mu < \mu_{max}$ for both of the present invention and the second prior art have a tendency to decreasing its value as the D/U ratio increases its negative value, the rate at which the upper limit of the second prior art decreases is higher than that of the present invention and becomes smaller than 0.01 at −20 dB D/U ratio. Since proper adaptive convergence is not possible for the second prior art using an update coefficient of 0.01, it should be set at a value smaller than 0.0099 for D/U=−20 dB and 0.00099 for D/U=−30 dB. However, with such small update coefficient values, adaptive convergence would be considerably slowed down and become incapable of responding to variations which may encounter with fading and interference.

In contrast, the upper update coefficient limit $\mu_{max}$ of the present invention is greater than the best LMS update coefficient value of 0.01 in the range of +10 dB and −30 dB. Thus, proper convergence operation is guaranteed even if it is set equal to 0.01.

What is claimed is:

1. An interference canceller comprising:

first and second diversity branches;

first and second amplifiers for normalizing the output signals of the first and second diversity branches, respectively;

first and second multipliers for multiplying the output signals of the first and second amplifiers with first and second weight coefficients, respectively;

a diversity combiner for combining the output signals of the first and second multipliers;

a third amplifier for normalizing the output signal of the diversity combiner;

a first correlation circuit for determining the correlations between the output signal of said third amplifier and the output signals of said first and second amplifiers to produce first and second correlation values, respectively, and applying the first and second correlation values to said first and second multipliers as said first and second weight coefficients;

third and fourth multipliers for multiplying the output signals of said first and second multipliers with third and fourth weight coefficients, respectively;

a subtractor for detecting a difference between the output signals of the third and fourth multipliers;

a least mean square adaptive equalizer for adaptively equalizing said difference and deriving therefrom a decision error; and a second correlation circuit for determining the correlations between the decision error and the output signals of the first and second multipliers for producing third and fourth correlation values and applying the third and fourth correlation values to said third and fourth multipliers as said third and fourth weight coefficients, respectively, whereby the least mean square of said decision error is reduced to a minimum.

2. An interference canceller comprising:

first and second diversity branches;

first and second amplifiers for normalizing the output signals of the first and second diversity branches, respectively;

first and second multipliers for multiplying the output signals of said first and second amplifiers with first and second weight coefficients, respectively;

a diversity combiner for combining input signals applied thereto;

a third amplifier for normalizing the output signal of the diversity combiner;

a first correlation circuit for determining the correlations between the output signal of said third amplifier and the output signals of said first and second amplifiers to produce first and second correlation values, respectively, and applying the first and second correlation values to said first and second multipliers as said first and second weight coefficients;

a subtractor for detecting a difference between input signals applied thereto;

a least mean square adaptive equalizer for adaptively equalizing said difference and deriving therefrom a decision error;

a second correlation circuit for determining the correlations between the decision error and the output signals of the first and second multipliers, respectively, for producing third and fourth weight coefficients, whereby the least mean square of said decision error is reduced to a minimum;

third and fourth multipliers for multiplying the first and second weight coefficients with the third and fourth weight coefficients, respectively; and fifth and sixth multipliers for multiplying the output signals of the first and second amplifiers with the output signals of the third and fourth multipliers, respectively, to produce fifth and sixth multiplied signals and applying the fifth and sixth multiplied signals to the diversity combiner and the subtractor.

3. An interference canceller as claimed in claim 1 or 2, wherein the second correlation circuit has a time constant with which the second correlation circuit updates the first and second weight coefficients and said adaptive equalizer has a time constant at which the equalizer derives said decision error, the time constant of said second correlation circuit being smaller than the time constant of the adaptive equalizer.

4. An interference canceller as claimed in claim 1 or 2, wherein said adaptive equalizer is a decision feedback equalizer comprising:

a forward filter having a tapped-delay line for receiving the output signal of said subtractor, a plurality of correlators for determining correlations between tap signals on said delay line and said decision error to produce tap-weight coefficients proportional to an update coefficient, and a plurality of tap-weight multipliers for multiplying the tap signals with said tap-weight coefficients, respectively, to remove intersymbol interference caused by a leading edge of a channel impulse response;

a second subtractor having a first input connected to the output of the forward filter and a second input;

a decision circuit for making a decision on output signals from the second subtractor and producing therefrom a decision signal;

an error detector connected to the input and output of the decision circuit for deriving said decision error; and a backward filter having a tapped-delay line for receiving the decision signal, a plurality of correlators for determining correlations between tap signals on said delay line and said decision error to produce tap-weight coefficients proportional to said update coefficient, and a plurality of tap-weight multipliers for multiplying the tap signals with said tap-weight coefficients, respectively, to remove intersymbol interference caused by a trailing edge of the channel impulse response.

5. An interference canceller as claimed in claim 4, wherein the second correlation circuit has a time constant with which the second correlation circuit updates the third and fourth weight coefficients and each of said forward and backward filters has a time constant which is inversely proportional to said update coefficient, the time constant of said second correlation circuit being smaller than the time constant of each of said forward and backward filters.

6. An interference canceller as claimed in claim 1 or 2, further comprising means for coupling the output signal of said subtractor to said adaptive equalizer in the presence of an interfering signal and coupling the output signal of said diversity combiner to said adaptive equalizer in the absence of said interfering signal.

7. A method for cancelling interference comprising the steps of:
   a) receiving transmitted signals through first and second diversity branches;
   b) normalizing the output signals of the first and second diversity branches, respectively, to produce first and second normalized signals;
   c) multiplying the first and second normalized signals with first and second weight coefficients, respectively, to produce first and second multiplied signals;
   d) combining the first and second multiplied signals to produce a diversity-combined signal;
   e) normalizing the diversity-combined signal to produce a third normalized signal;
   f) determining the correlations between each of the first and second normalized signals and said third normalized signal to produce said first and second weight coefficients, and repeating the step (c);
   g) multiplying the first and second multiplied signals with third and fourth weight coefficients, respectively, to produce third and fourth multiplied signals;
   h) detecting a difference between the third and fourth multiplied signals;
   i) adaptively equalizing said difference according to least mean square algorithm and deriving therefrom a decision error; and
   j) determining the correlations between the decision error and the first and second multiplied signals to produce said third and fourth weight coefficients, and repeating the step (g) so that the least mean square of said decision error is reduced to a minimum.

8. A method for cancelling interference comprising the steps of:
   a) receiving transmitted signals through first and second diversity branches;
   b) normalizing the output signals of the first and second diversity branches, with first and second amplifiers respectively, to produce first and second normalized signals;
   c) multiplying the output signals of said first and second amplifiers with first and second weight coefficients, respectively, to produce first and second multiplied signals;
   d) determining the correlations between a normalized diversity-combined signal and the first and second normalized signal to produce said first and second weight coefficients and repeating the step (c);
   e) determining the correlations between a decision error and the first and second multiplied signals to produce third and fourth weight coefficients, respectively.
   f) multiplying the first and second weight coefficients with the third and fourth weight coefficients, respectively, to produce third and fourth multiplied signals; and
   g) multiplying the first and second normalized signals with the third and fourth multiplied signals, respectively, to produce fifth and sixth multiplied signals;
   h) combining the fifth and sixth multiplied signals to produce a diversity-combined signal;
   i) normalizing the diversity-combined signal to produce said normalized diversity-combined signal and repeating the step (d);
   j) detecting a difference between the fifth and sixth multiplied signals;
   adaptively equalizing said difference according to least mean square algorithm and deriving therefrom said decision error and repeating the step (e) so that the least mean square of said decision error is reduced to a minimum.

* * * * *

UNITED STATES PATENT AND TRADEMARK OFFICE
CERTIFICATE OF CORRECTION

PATENT NO. : 5,524,023
DATED : June 4, 1996
INVENTOR(S) : Ichiro TSUJIMOTO

It is certified that error appears in the above-indentified patent and that said Letters Patent is hereby corrected as shown below:

Column 7, line 43, delete "$+e, dus\Delta h_i$" and insert --$\Delta h_i$--.

Column 11, line 29, delete "$h_2S$" and insert --$h_2 \cdot S$--.

Column 11, line 32, equation (48), delete "$+e, dus\Delta \alpha^2$" and insert --$\Delta \alpha^2$--.

Column 11, line 34, equation (49), delete "$+e, dus\Delta \beta^2$" and insert --$\Delta \beta^2$--.

Column 11, line 36, equation (50), delete "$+e, dus\Delta \alpha^2$" and insert --$\Delta \alpha^2$--.

Column 11, line 38, equation (41), delete "$+e, dus\Delta \beta^2$" and insert --$\Delta \beta^2$--.

Column 13, line 15, delete "$\dashv(y_1$" and insert --$S(y_1$--.

Column 13, line 17, delete "$\dashv(y_2$" and insert --$S(y_2$--.

Column 14, line 50, delete "$\overset{\Delta}{=}$" and insert --$\Delta$--.

UNITED STATES PATENT AND TRADEMARK OFFICE
CERTIFICATE OF CORRECTION

PATENT NO. : 5,524,023
DATED : June 4, 1996
INVENTOR(S) : Ichiro TSUJIMOTO

It is certified that error appears in the above-indentified patent and that said Letters Patent is hereby corrected as shown below:

Column 14, line 58, delete "+e, dus$\Delta$pi" and insert --$\Delta$pi--.

Column 14, lines 61-63, equation (71), delete " $\begin{matrix}\phi(1,2)\\\phi(2,2)\end{matrix}$ "

and insert -- $\begin{matrix}-\phi(1,2)\\-\phi(2,2)\end{matrix}$ --.

Column 15, line 52, delete "+e, dus$\Delta$1" and insert --$\Delta$1--.

Column 20, line 37, before "adaptively" insert -- k)--.

Signed and Sealed this

Nineteenth Day of November, 1996

Attest:

BRUCE LEHMAN

Attesting Officer     Commissioner of Patents and Trademarks